(12) United States Patent
Dimou et al.

(10) Patent No.: US 11,589,293 B2
(45) Date of Patent: Feb. 21, 2023

(54) NON REGULAR SEARCH SPACE CONFIGURATION AND ADAPTATION

(71) Applicant: QUALCOMM Incorporated, San Diego, CA (US)

(72) Inventors: Konstantinos Dimou, San Francisco, CA (US); Yan Zhou, San Diego, CA (US); Tao Luo, San Diego, CA (US); Xiao Feng Wang, San Diego, CA (US); Mahmoud Taherzadeh Boroujeni, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/023,651

(22) Filed: Sep. 17, 2020

(65) Prior Publication Data

US 2021/0105705 A1    Apr. 8, 2021

Related U.S. Application Data (60) Provisional application No. 62/910,206, filed on Oct. 3, 2019.

(51) Int. Cl.
| | |
|---|---|
| *H04W 4/00* | (2018.01) |
| *H04W 48/12* | (2009.01) |
| *H04L 5/00* | (2006.01) |
| *H04W 72/04* | (2023.01) |
| *H04W 72/0453* | (2023.01) |
| *H04W 72/0446* | (2023.01) |
| *H04W 28/02* | (2009.01) |
| *H04W 76/27* | (2018.01) |

(52) U.S. Cl.
CPC .......... *H04W 48/12* (2013.01); *H04L 5/0005* (2013.01); *H04W 28/0205* (2013.01); *H04W 72/042* (2013.01); *H04W 72/0446* (2013.01); *H04W 72/0453* (2013.01); *H04W 76/27* (2018.02)

(58) Field of Classification Search
CPC ............ H04W 48/12; H04W 28/0205; H04W 72/042; H04W 72/0446; H04W 76/27; H04L 5/0005; H04L 5/0048; H04L 5/0057

See application file for complete search history.

(56) References Cited

U.S. PATENT DOCUMENTS

| | | | | |
|---|---|---|---|---|
| 10,356,803 | B2* | 7/2019 | Kim | H04L 5/0053 |
| 10,951,383 | B2* | 3/2021 | Lu | H04W 24/08 |
| 11,153,872 | B2* | 10/2021 | Huang | H04L 5/0007 |
| 2017/0373801 | A1* | 12/2017 | Bergstrom | H04L 1/1628 |
| 2019/0104510 | A1 | 4/2019 | Lee et al. | |

(Continued)

FOREIGN PATENT DOCUMENTS

WO    2018126401 A1    7/2018

OTHER PUBLICATIONS

International Search Report and Written Opinion—PCT/US2020/051604—ISA/EPO—dated Mar. 2, 2021.

(Continued)

*Primary Examiner* — Abdelnabi O Musa
(74) *Attorney, Agent, or Firm* — Patterson + Sheridan, LLP (57) ABSTRACT

Aspects of the present disclosure provide apparatus, methods, processing systems, and computer readable mediums for signaling and processing dynamic control channel resources with irregular search space configurations.

30 Claims, 7 Drawing Sheets

(56) References Cited

U.S. PATENT DOCUMENTS

| | | | |
|---|---|---|---|
| 2019/0349180 A1* | 11/2019 | Lu | H04L 27/2607 |
| 2020/0196343 A1* | 6/2020 | Marinier | H04W 72/1289 |
| 2020/0245333 A1* | 7/2020 | Lin | H04L 5/0057 |
| 2020/0314811 A1* | 10/2020 | Lin | H04L 5/0094 |
| 2021/0006376 A1* | 1/2021 | Cirik | H04L 5/0094 |
| 2021/0029726 A1* | 1/2021 | Papasakellariou | H04W 72/0493 |
| 2021/0234640 A1* | 7/2021 | Cirik | H04L 1/1819 |
| 2021/0314866 A1* | 10/2021 | Lee | H04W 76/28 |

OTHER PUBLICATIONS

Oppo: "UE Adaptation to the Traffic and UE Power Consumption", 3GPP Draft, R1-1902745, 3GPP TSG RAN WG1 #96, 3rd Generation Partnership Project (3GPP), Mobile Competence Centre, 650, Route Des Lucioles, F-06921, Sophia-Antipolis Cedex, France, vol. Ran WG1, No. Athens Greece, Feb. 25, 2019-Mar. 1, 2019, Feb. 16, 2019 (Feb. 16, 2019), XP051600440, 14 Pages.

Samsung: "UE Adaptation Schemes", 3GPP Draft, R1-1813011, 3GPP TSG RAN WG1 Meeting #95, UE Adaptation Schemes, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051554989, 11 Pages.

* cited by examiner

NON REGULAR SEARCH SPACE CONFIGURATION AND ADAPTATION

CROSS REFERENCE TO RELATED APPLICATION

This Application hereby claims priority under 35 U.S.C. § 119 to U.S. Provisional Patent Application No. 62/910,206, filed on Oct. 3, 2019, the contents of which are incorporated herein in their entirety.

TECHNICAL FIELD

Aspects of the present disclosure relate to wireless communications, and more particularly, to techniques for signaling and processing dynamic control channel resources with non-regular search space configurations.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communications by a user equipment (UE). The method generally includes detecting a first downlink control information (DCI) in a first physical downlink control channel (PDCCH) monitoring occasion, the first DCI indicating at least one next PDCCH monitoring occasion and one or more search space parameters and monitoring the at least one next PDCCH monitoring occasion for at least a second DCI, in accordance with the search space parameters.

Another innovative aspect of the subject matter described in this disclosure can be implemented in a method for wireless communications by a network entity. The method generally includes transmitting a first downlink control information (DCI) to a user equipment (UE) in a first physical downlink control channel (PDCCH) monitoring occasion, the first DCI indicating at least one next PDCCH monitoring occasion and one or more search space parameters and transmitting at least a second DCI in the at least one next PDCCH monitoring occasion, in accordance with the search space parameters.

Another innovative aspect of the subject matter described in this disclosure can be implemented in an apparatus for wireless communications by a user equipment (UE). The apparatus generally includes a processing system configured to detect a first downlink control information (DCI) in a first physical downlink control channel (PDCCH) monitoring occasion, the first DCI indicating at least one next PDCCH monitoring occasion and one or more search space parameters and monitor the at least one next PDCCH monitoring occasion for at least a second DCI, in accordance with the search space parameters.

Another innovative aspect of the subject matter described in this disclosure can be implemented in a network entity. The network entity generally includes a transmitter configured to transmit a first downlink control information (DCI) to a user equipment (UE) in a first physical downlink control channel (PDCCH) monitoring occasion, the first DCI indicating at least one next PDCCH monitoring occasion and one or more search space parameters and transmit at least a second DCI in the at least one next PDCCH monitoring occasion, in accordance with the search space parameters.

Another innovative aspect of the subject matter described in this disclosure can be implemented in an apparatus for wireless communications by a user equipment (UE). The apparatus generally includes means for detecting a first downlink control information (DCI) in a first physical downlink control channel (PDCCH) monitoring occasion, the first DCI indicating at least one next PDCCH monitoring occasion and one or more search space parameters and means for monitoring the at least one next PDCCH monitoring occasion for at least a second DCI, in accordance with the search space parameters.

Another innovative aspect of the subject matter described in this disclosure can be implemented in a network entity. The network entity generally includes means for transmitting a first downlink control information (DCI) to a user equipment (UE) in a first physical downlink control channel (PDCCH) monitoring occasion, the first DCI indicating at least one next PDCCH monitoring occasion and one or more search space parameters and means for transmitting at least a second DCI in the at least one next PDCCH monitoring occasion, in accordance with the search space parameters.

Another innovative aspect of the subject matter described in this disclosure can be implemented in an apparatus for wireless communications by a network entity (UE). The network entity generally includes a processing system configured to generate a first downlink control information (DCI) and at least a second DCI and an interface configured to provide the first downlink control information (DCI) for transmission to a user equipment (UE) in a first physical downlink control channel (PDCCH) monitoring occasion, the first DCI indicating at least one next PDCCH monitoring occasion and one or more search space parameters and provide the at least a second DCI for transmission to in the at least one next PDCCH monitoring occasion, in accordance with the search space parameters.

Another innovative aspect of the subject matter described in this disclosure can be implemented in a UE. The UE generally includes at least one antenna and a processing system configured to detect, via the at least one antenna, a first downlink control information (DCI) in a first physical downlink control channel (PDCCH) monitoring occasion, the first DCI indicating at least one next PDCCH monitoring occasion and one or more search space parameters and monitor, via the at least one antenna, the at least one next PDCCH monitoring occasion for at least a second DCI, in accordance with the search space parameters.

Another innovative aspect of the subject matter described in this disclosure can be implemented in a computer-readable medium for wireless communications by an apparatus. The computer-readable medium generally includes codes executable to detect a first downlink control information (DCI) in a first physical downlink control channel (PDCCH) monitoring occasion, the first DCI indicating at least one next PDCCH monitoring occasion and one or more search space parameters and monitor the at least one next PDCCH monitoring occasion for at least a second DCI, in accordance with the search space parameters.

Another innovative aspect of the subject matter described in this disclosure can be implemented in a computer-readable medium for wireless communications by a network entity. The computer-readable medium generally includes codes executable to transmit a first downlink control information (DCI) to a user equipment (UE) in a first physical downlink control channel (PDCCH) monitoring occasion, the first DCI indicating at least one next PDCCH monitoring occasion and one or more search space parameters and transmit at least a second DCI in the at least one next PDCCH monitoring occasion, in accordance with the search space parameters.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to techniques for signaling and processing dynamic control channel resources with non-regular search space configurations.

The following description provides examples of techniques for signaling and processing dynamic control channel resources with non-regular search space configurations, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
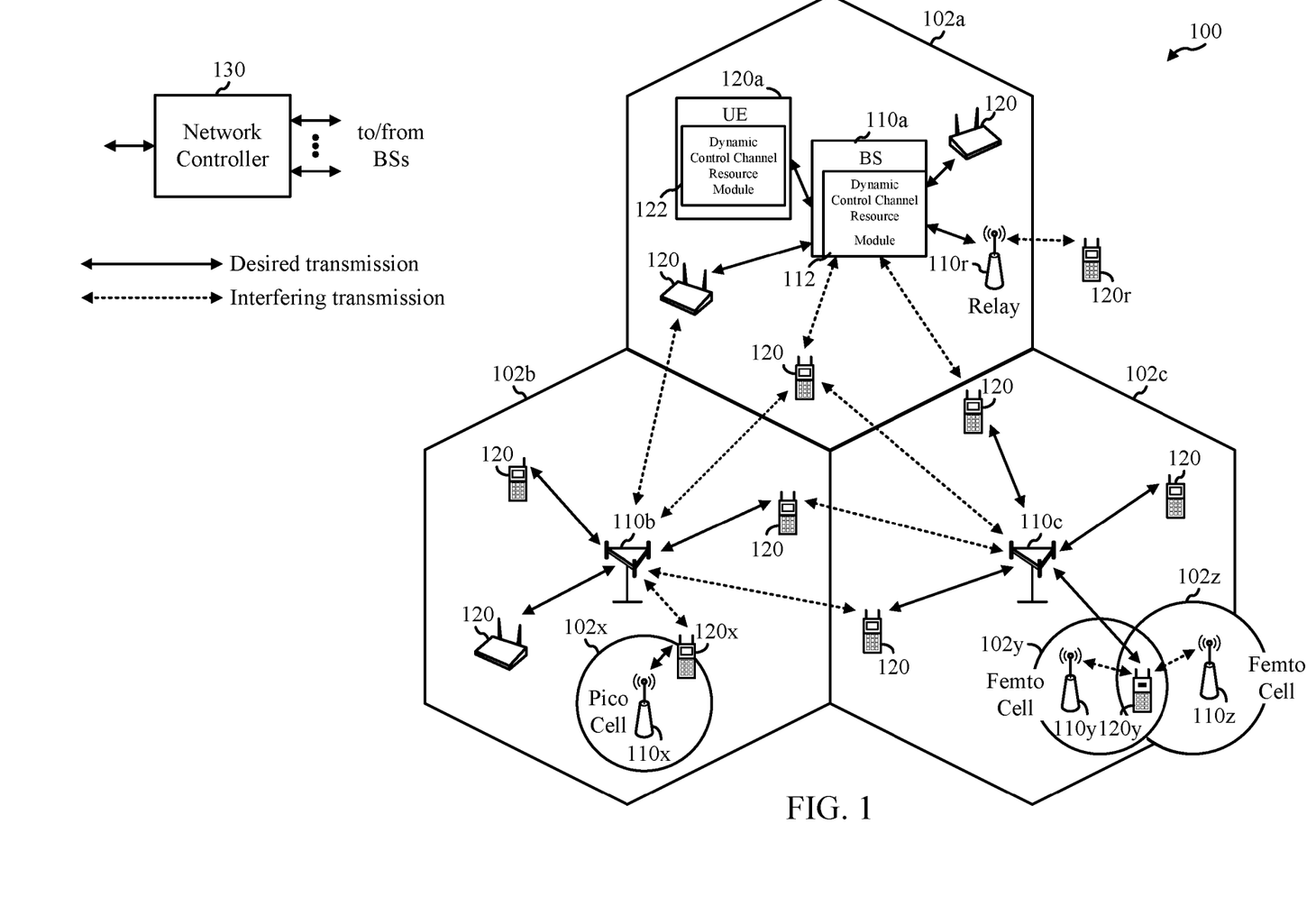
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a Dynamic Control Channel Resource Module 122 that may be configured to perform (or cause UE 120a to perform) operations 500 of FIG. 5. Similarly, base station 110a may include a Dynamic Control Channel Resource Module 112 that may be configured to perform (or cause BS 110a to perform) operations 600 of FIG. 6 (e.g., to signal dynamic control channel resources to a UE performing operations 500).

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
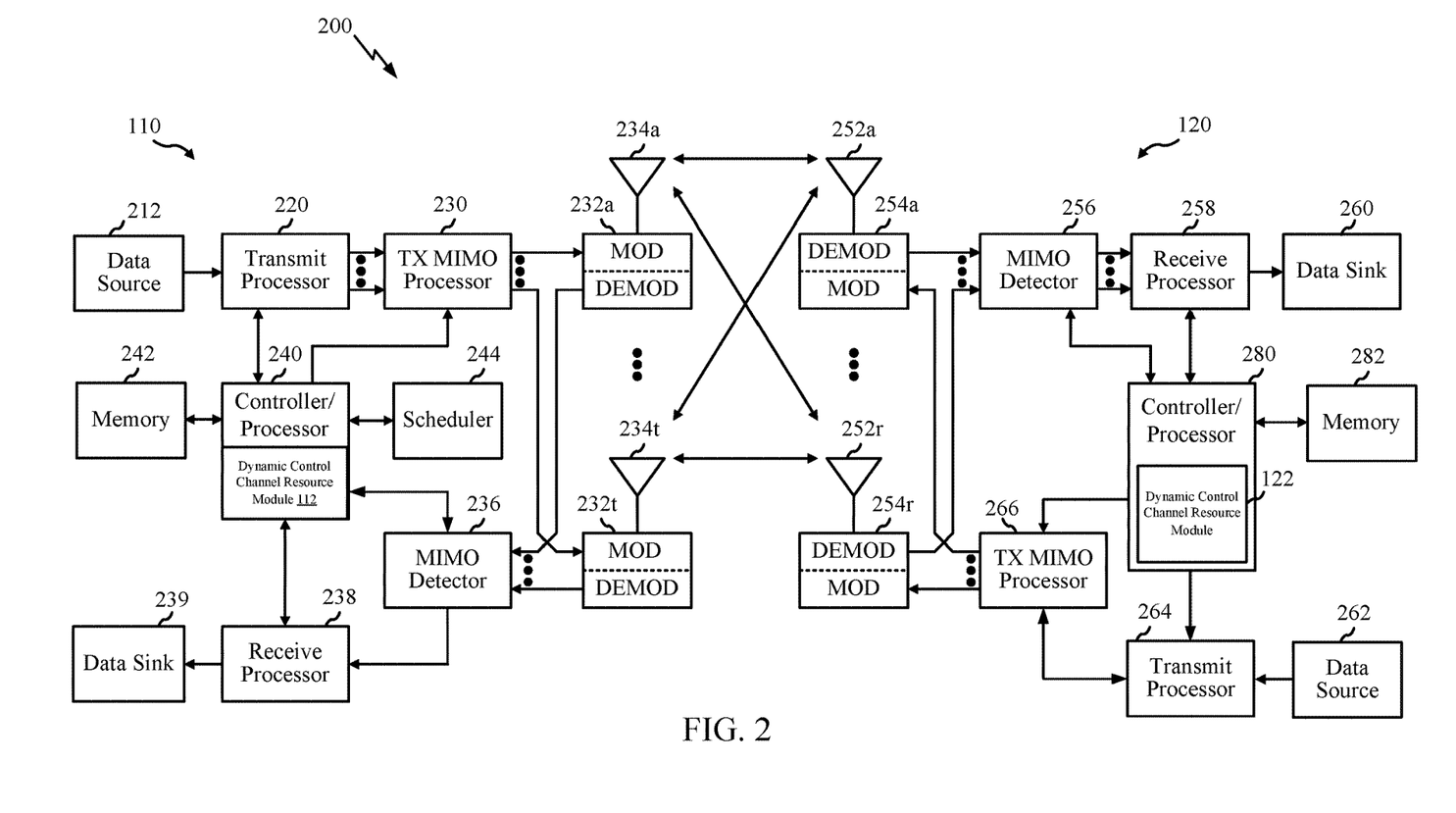
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a Dynamic Control Channel Module 122 that may be configured to perform operations 500 of FIG. 5, while the controller/processor 240 of the BS 110 has a Dynamic Control Channel Module 122 that may be configured to perform operations 600 of FIG. 6. Although shown at the Controller/Processor, other components of the UE or BS may be used to perform the operations described herein.

Figure 3:
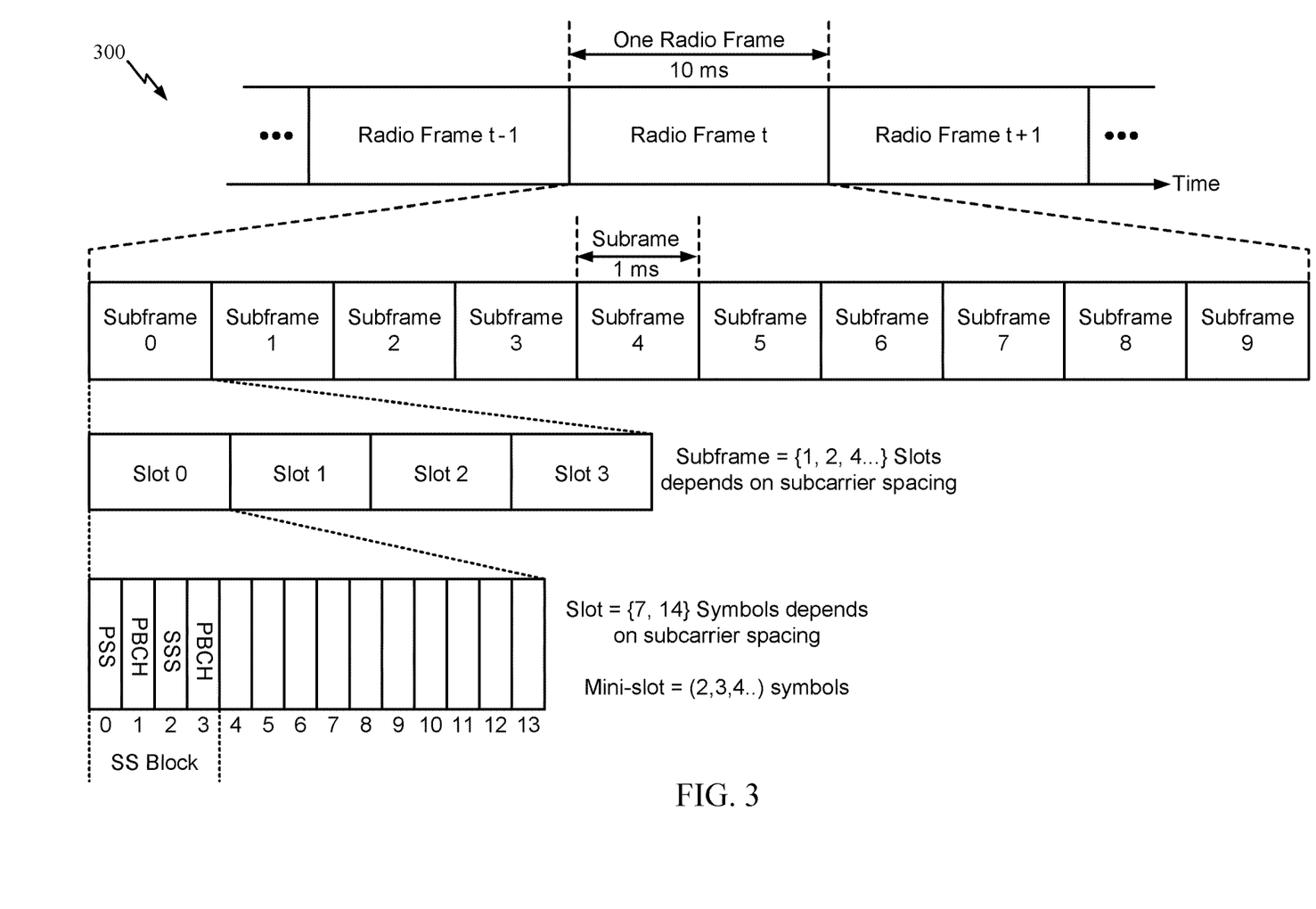
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Signaling Dynamic Control Channel Resources with Non-Regular Search Space Configurations Aspects of the present disclosure provide apparatus, methods, processing systems, and computer readable mediums for processing and signaling dynamic control channel resources with non-regular search space configurations.

As noted above, a UE searches within a CORESET for PDCCH transmissions with downlink control information (DCI), for example, that may carry a grant for downlink (PDSCH) or uplink (PUSCH) data transmissions. Monitoring for DCI can result in significant power consumption at the UE. Some studies indicate up to 40% of total power consumed by a UE may be for monitoring for PDCCH transmissions.

In some scenarios, control channel resource (e.g., CORESETs and search space sets) can be sparsely configured (e.g., occurring with a relatively low periodicity). Sparse control channel monitoring by the UE may provide power savings. For example, a PDCCH monitoring periodicity (e.g., by search space periodicity configuration in NR) can be very large (e.g., >>1 slots) in some configurations.

Sparse control channel resources may limit scheduling flexibility and increase latency. In some cases, control channel resources (e.g., additional control channel resources between regular sparse PDCCH monitoring occasions) may be dynamically indicated to help avoid these drawbacks of sparse control channel resources. In some cases, a network entity (e.g., a gNB) may dynamically indicate additional control channel resources in certain conditions, for example, to accommodate an increase (burst) of traffic targeting a particular UE.

Figure 4:
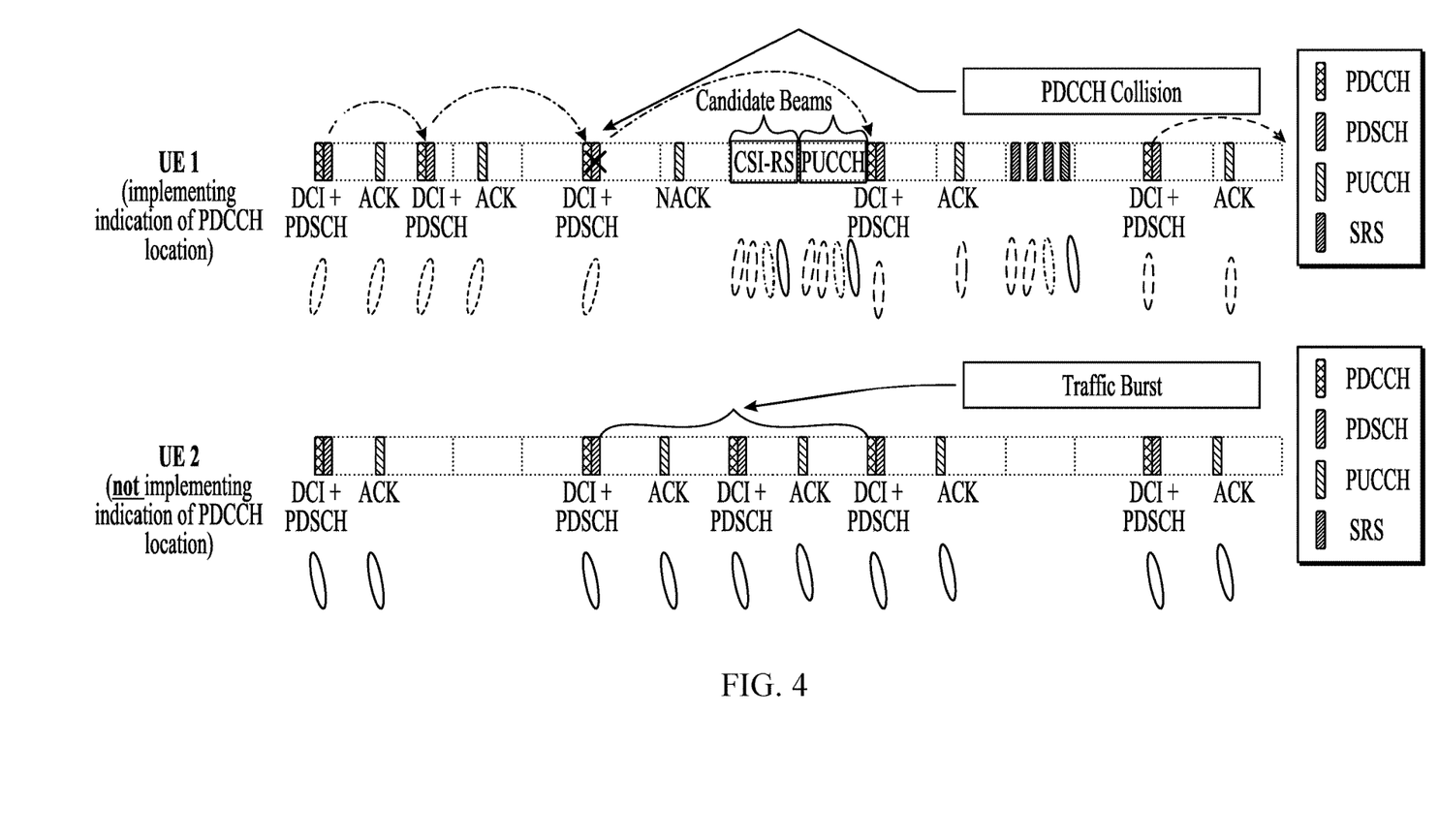
FIG. 4 illustrates an example technique for indicating a next physical downlink control channel (PDCCH) monitoring occasion.

FIG. 4 illustrates one example of how dynamic signaling of control channel resources may be used to help reduce UE power consumption (by limiting the amount of PDCCH monitoring). As illustrated, a first UE (UE 1) may be configured to support dynamic indication of a PDCCH location. For example, UE 1 may be configured to monitor for PDCCH/DCI in certain regular (possibly sparse) monitoring occasions. DCI in those regular monitoring occasions may indicate a location of a next PDCCH monitoring location (in dynamically signaled control channel resources).

Indication of next PDCCH monitoring locations in this manner may not be optimal in terms of scheduling flexibility. Further, essentially reserving control channel resources for UE 1 in this manner, to allow for signaling of next PDCCH monitoring may increase the collision probability, for example, in the case unexpected traffic or a load burst arrives from another UE.

For example, the illustrated example shows a second UE 2 (that is not configured to support the indication of PDCCH locations) that experiences a traffic burst (e.g., with a window of downlink data/PDSCH transmissions). As illustrated by the "X" one of the DCI scheduling a PDSCH transmission for the UE 2 traffic burst may collide with one of the indicated PDCCH/DCI monitoring occasions of UE 1.

Aspects of the present disclosure, however, may help reduce the possibility of such collision, while maintaining scheduling flexibility and leveraging the use of dynamic indication of PDCCH location.

As will be described, the techniques presented herein may allow the amount of control channel resources effectively reserved for a UE via dynamic signaling (e.g., to cut down on the amount of time the UE spends blind decoding) may be adapted to network conditions (e.g., traffic loading). For example, search space parameters for dynamically signaled PDCCH monitoring occasions may be adapted (to reserve less resources) to avoid collision between resources dynamically signaled for one UE and resources used to provide a burst of traffic for other UEs. Conversely, the search space parameters may be adapted (to reserve more resources) to allow precise locations (of time/frequency resources) within PDCCH monitoring occasions to help a UE reduce the amount of time it spends performing blind decodes.

As used herein, a search space is referred to as non-regular if it allows physical downlink control channel (PDCCH) locations (time and frequency resources) not currently supported. The use of non-regular search spaces may allow a network entity (e.g., a base station/gNB) scheduling flexibility and the ability to adapt to changing conditions by changing search space parameters (as noted above).

Figure 5:
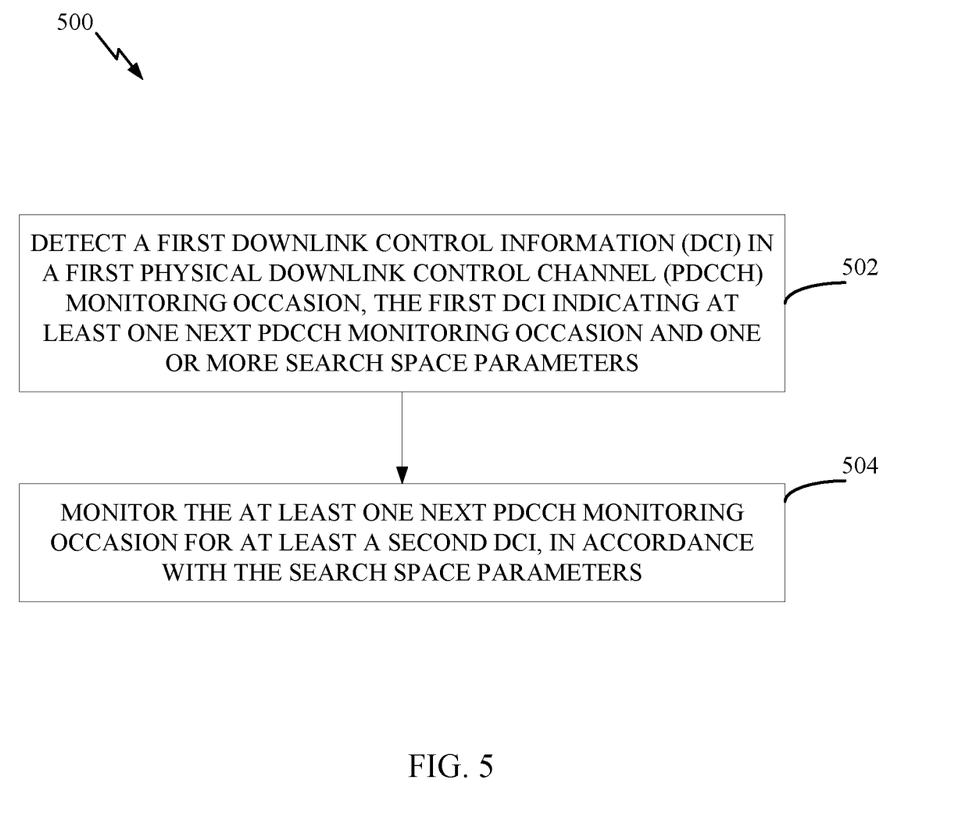
FIG. 5 illustrates example operations for wireless communication by a user equipment (UE), in accordance with some aspects of the present disclosure.

FIG. 5 illustrates example operations 500 for wireless communication by a UE, in accordance with some aspects of the present disclosure. For example, operations 500 may be performed by a UE 120a of FIG. 1 to utilize additional control channel resources and search space configurations dynamically indicated by a base station.

Operations 500 begin, at 502, by detecting a first downlink control information (DCI) in a first physical downlink control channel (PDCCH) monitoring occasion, the first DCI indicating at least one next PDCCH monitoring occasion and one or more search space parameters. At 504, the UE monitors the at least one next PDCCH monitoring occasion for at least a second DCI, in accordance with the search space parameters.

Figure 6:
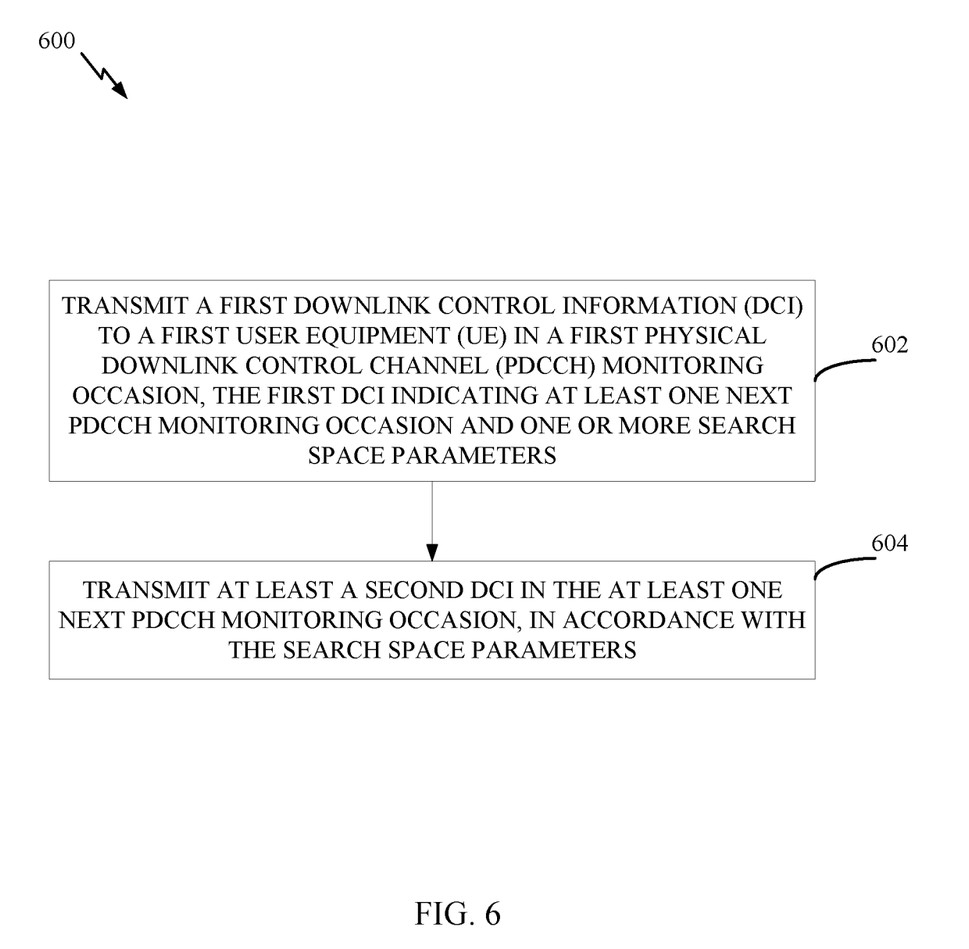
FIG. 6 illustrates example operations for wireless communication by a network entity, in accordance with some aspects of the present disclosure.

FIG. 6 illustrates example operations 600 for wireless communication by a network entity (e.g., a gNB). For example, operations 600 may be performed by a base station 110a of FIG. 1 to dynamically indicate additional control channel resources and search space configurations to a UE (performing operations 500).

Operations 600 begin, at 602, by transmitting a first downlink control information (DCI) to a first user equipment (UE) in a first physical downlink control channel (PDCCH) monitoring occasion, the first DCI indicating at least one next PDCCH monitoring occasion and one or more search space parameters. At 604, the network entity transmits at least a second DCI in the at least one next PDCCH monitoring occasion, in accordance with the search space parameters.

Figure 7:
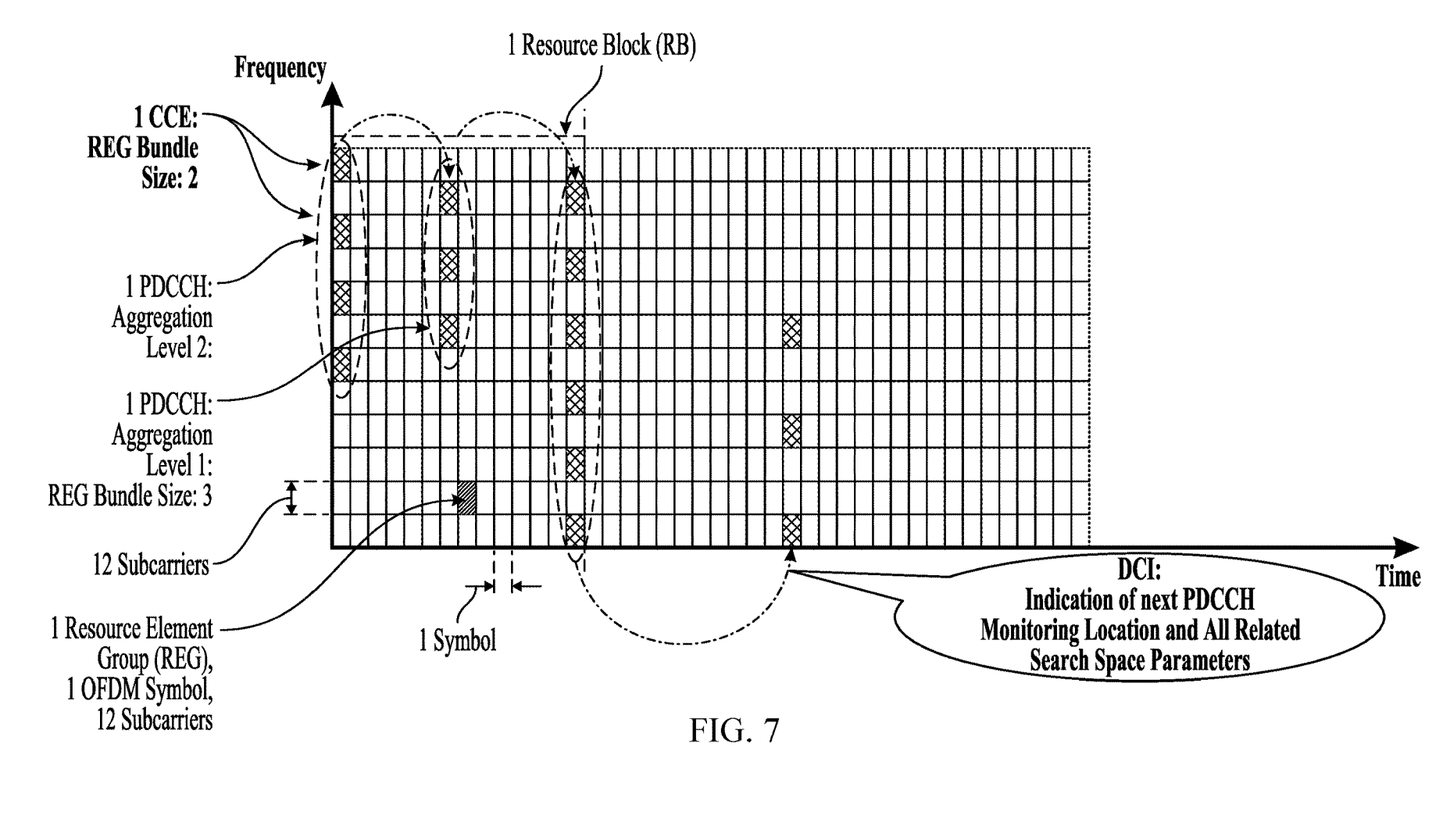
FIG. 7 illustrates example use of non-regular search space for PDCCH monitoring occasions, in accordance with some aspects of the present disclosure.

Operations 500 and 600 of FIGS. 5 and 6 may be understood with reference to the timing diagrams of FIG. 7 that illustrate examples of how irregular search space configurations may be used.

FIG. 7 illustrates how DCI may be conveyed in a PDCCH monitoring occasion according to various time and frequency resource patterns, in any symbol within the slot (or a next slot). For example, a first DCI (in the first symbol) may be conveyed via a PDCCH with aggregation level two with 2 CCEs, each having a resource element group (REG) size of 2. A second DCI (in the 7th symbol) may be conveyed via a PDCCH with aggregation level one with 1 CCE having a resource element group (REG) size of 3. A third DCI (in the last symbol) may have 6 REGs (e.g., aggregation level 2 with 2 CCEs having REG size of 3).

As illustrated, each DCI may indicate irregular PDCCH time and frequency locations. For example, the DCI may indicate a PDCCH location within any symbol in the slot (not currently supported).

In general, the DCI may also indicate irregular time and frequency patterns (e.g., with different interleaving) and irregular search space configurations. In general, the DCI may indicate the next PDCCH monitoring location and all related search space parameters (with the search space parameters indicating the pattern of time and frequency resources for the PDCCH locations within the slot and possibly which slots).

In some cases, the pattern may indicate one or more symbol locations within the slot containing the PDCCH locations as well as a set of frequency resources for each of the indicated symbol locations. In some cases, the pattern may indicate a type of location pattern (e.g., an interleaving pattern) for the set of frequency resources for each of the indicated symbol locations.

In some cases, the UE may be configured with different patterns of time and frequency resources for the PDCCH locations. In such cases, DCI may indicate one of the different patterns for the UE to use to monitor for the second DCI in the at least one next PDCCH monitoring occasion. The different patterns may be signaled, for example, via at least one of radio resource control (RRC) signaling, a media access control (MAC) control element (MAC-CE), or a downlink control information (DCI), possibly as part of an irregular PDCCH configuration. In some cases, the irregular PDCCH configuration indicates different patterns for different PDCCH monitoring occasions.

In some cases, the DCI may also indicate a time period for which the UE is to monitor PDCCH monitoring occasions according to the search space parameters. In some cases, the search space parameters and time period may be adapted to certain conditions. For example, the gNB may decide on at least one of a length of the window or what search space parameters to signal via the first DCI based on one or more conditions. For example, the gNB may set/adjust at least one of the length of the window or search space parameters are chosen to adapt an amount search space resources reserved for the first UE to system traffic loading (e.g., to reserve less search space resources for the first UE if system traffic loading is high and reserve more search space resources for the first UE if system traffic loading is low).

The techniques presented herein may provide a relatively high degree of flexibility in terms of scheduling. As noted above, irregular patterns may be signaled via RRC, MAC CE, or DCI, in some cases as part of an Initial irregular PDCCH configuration. After the initial configuration, the search space configuration may be adapted, and different patterns may be provided for a given monitoring location or for different monitoring locations.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors 266, 258, 264, and/or controller/processor 280 of the UE 120 and/or processors 220, 230, 238, and/or controller/processor 240 of the BS 110 shown in FIG. 2 may be configured to perform operations 500 of FIG. 5 and/or operations 600 of FIG. 6.

Means for receiving may include a receiver (such as one or more antennas or receive processors) illustrated in FIG. 2. Means for transmitting or means for outputting may include a transmitter or an antenna(s) 234 of the B S 110 or antenna(s) 252 of the UE 120 illustrated in FIG. 2. Each of means for detecting, means for monitoring, and means for deciding may include a processing system, which may include one or more processors, such as processors 266, 258, 264, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   detecting first downlink control information (DCI) in a first physical downlink control channel (PDCCH) monitoring occasion, the first DCI indicating at least one next PDCCH monitoring occasion, one or more search space parameters indicating one or more PDCCH locations within the at least one next PDCCH monitoring occasion, and a time period to monitor the at least one next PDCCH monitoring occasion; and
   monitoring the at least one next PDCCH monitoring occasion for at least second DCI, in accordance with the one or more search space parameters, within the time period.

2. The method of claim 1, wherein:
   the at least one next PDCCH monitoring occasion comprises a slot.

3. The method of claim 2, wherein the one or more search space parameters indicate a pattern of time and frequency resources for the one or more PDCCH locations within the slot.

4. The method of claim 3, wherein the pattern indicates:
   one or more symbol locations within the slot; and
   a set of frequency resources for each of the one or more symbol locations.

5. The method of claim 4, wherein the pattern further indicates a type of location pattern for the set of frequency resources for each of the one or more symbol locations.

6. The method of claim 2, further comprising:
   receiving signaling of different patterns of time and frequency resources for the one or more PDCCH locations, wherein the first DCI further indicates one of the different patterns; and
   the method further comprises monitoring the at least one next PDCCH monitoring occasion for the second DCI in accordance with the pattern indicated by the first DCI.

7. The method of claim 6, wherein the different patterns are signaled via at least one of radio resource control (RRC) signaling, a media access control (MAC) control element (MAC-CE), or downlink control information (DCI).

8. The method of claim 6, wherein the different patterns are signaled as part of an irregular PDCCH configuration.

9. The method of claim 8, wherein the irregular PDCCH configuration indicates the different patterns for different PDCCH monitoring occasions.

10. The method of claim 1, wherein the time period is based on one or more frequency resources reserved for the UE.

11. A method for wireless communications by a network entity, comprising:
    transmitting first downlink control information (DCI) to a user equipment (UE) in a first physical downlink control channel (PDCCH) monitoring occasion, the first DCI indicating at least one next PDCCH monitoring occasion, one or more search space parameters indicating one or more PDCCH locations within the at least one next PDCCH monitoring occasion, and a time period to monitor the at least one next PDCCH monitoring occasion; and
    transmitting at least second DCI in the at least one next PDCCH monitoring occasion, in accordance with the one or more search space parameters.

12. The method of claim 11, wherein:
    the at least one next PDCCH monitoring occasion comprises a slot.

13. The method of claim 12, wherein the one or more search space parameters indicate a pattern of time and frequency resources for the one or more PDCCH locations within the slot.

14. The method of claim 12, wherein the pattern indicates:
    one or more symbol locations within the slot; and
    a set of frequency resources for each of the one or more symbol locations.

15. The method of claim 14, wherein the pattern further indicates a type of location pattern for the set of frequency resources for each of the one or more symbol locations.

16. The method of claim 12, further comprising:
    transmitting signaling, to the UE, of different patterns of time and frequency resources for the one or more PDCCH locations, and wherein:
    the first DCI further indicates one of the different patterns for the UE to use to monitor for the second DCI in the at least one next PDCCH monitoring occasion.

17. The method of claim 16, wherein the different patterns are signaled via at least one of radio resource control (RRC) signaling, a media access control (MAC) control element (MAC-CE), or downlink control information (DCI).

18. The method of claim 16, wherein the different patterns are signaled as part of an irregular PDCCH configuration.

19. The method of claim 18, wherein the irregular PDCCH configuration indicates the different patterns for different PDCCH monitoring occasions.

20. The method of claim 11, wherein the time period is based on one or more frequency resources reserved for the UE.

21. The method of claim 11, further comprising deciding on at least one of a length of a window or what search space parameters to signal via the first DCI based on one or more conditions.

22. The method of claim 21, wherein the one or more conditions relate to system traffic loading.

23. The method of claim 22, wherein the at least one of the length of the window or the one or more search space parameters are chosen to adapt an amount search space resources reserved for the UE with respect to the system traffic loading.

24. The method of claim 23, wherein the at least one of the length of the window or the one or more search space parameters are chosen to:

reserve less search space resources for the UE if the system traffic loading is above a first threshold; and reserve more search space resources for the UE if the system traffic loading is below a second threshold.

25. An apparatus for wireless communications by a user equipment (UE), comprising:
a memory comprising computer-executable instructions; and
a processor configured to execute the computer-executable instructions and cause the UE to:
detect first downlink control information (DCI) in a first physical downlink control channel (PDCCH) monitoring occasion, the first DCI indicating at least one next PDCCH monitoring occasion, one or more search space parameters indicating one or more PDCCH locations within the at least one next PDCCH monitoring occasion, and a time period to monitor the at least one next PDCCH monitoring occasion; and
monitor the at least one next PDCCH monitoring occasion for at least second DCI, in accordance with the one or more search space parameters, within the time period.

26. The apparatus of claim 25, wherein:
the at least one next PDCCH monitoring occasion comprises a slot; or
the time period is based on one or more frequency resources reserved for the UE.

27. The apparatus of claim 26, wherein the one or more search space parameters indicate a pattern of time and frequency resources for the one or more PDCCH locations within the slot.

28. A network entity, comprising:
a memory comprising computer-executable instructions; and
a processor configured to execute the computer-executable instructions and cause the network entity to:
transmit first downlink control information (DCI) to a user equipment (UE) in a first physical downlink control channel (PDCCH) monitoring occasion, the first DCI indicating at least one next PDCCH monitoring occasion, one or more search space parameters indicating one or more PDCCH locations within the at least one next PDCCH monitoring occasion, and a time period to monitor the at least one next PDCCH monitoring occasion; and
transmit at least second DCI in the at least one next PDCCH monitoring occasion, in accordance with the one or more search space parameters.

29. The network entity of claim 28, wherein:
the at least one next PDCCH monitoring occasion comprises a slot.

30. The network entity of claim 28, wherein the time period is based on one or more frequency resources reserved for the UE.

* * * * *